Jan. 27, 1953 E. M. SHIEPE 2,626,981
INDUCTANCE AND SELF-CAPACITANCE MEASURING DEVICE
Filed June 11, 1949
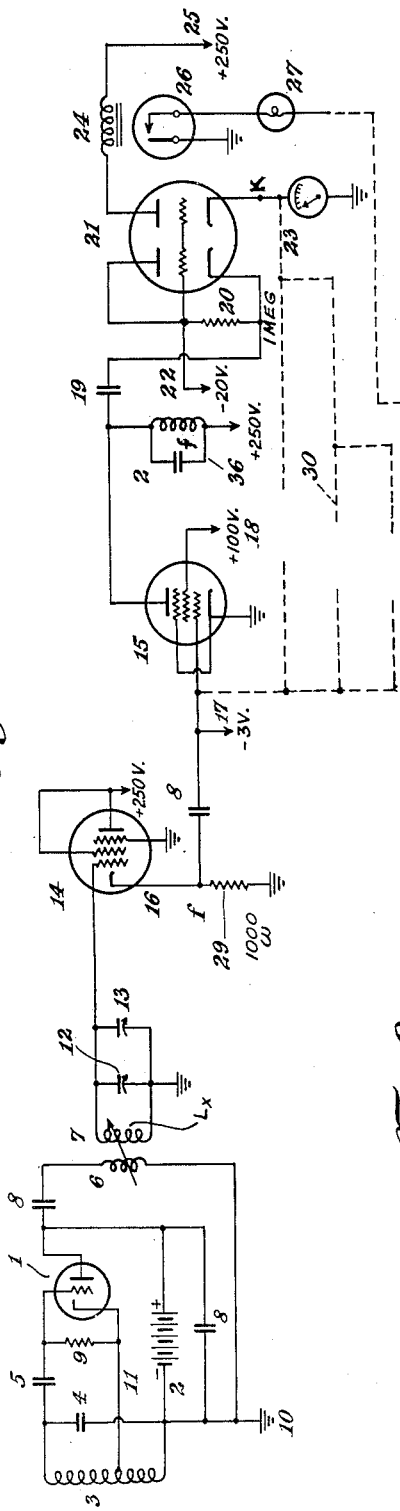
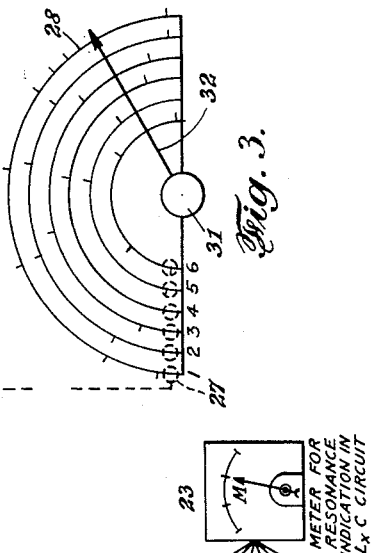
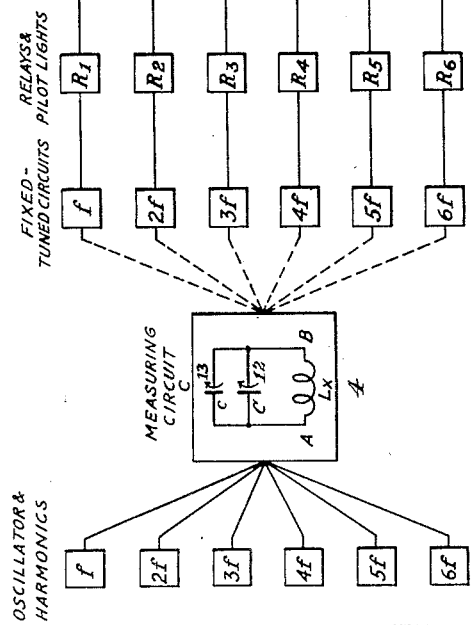
INVENTOR.
Edward M. Shiepe.
BY
William F. Nickel
ATTORNEY.

Patented Jan. 27, 1953

2,626,981

UNITED STATES PATENT OFFICE 2,626,981

INDUCTANCE AND SELF-CAPACITANCE MEASURING DEVICE

Edward M. Shiepe, Brooklyn, N. Y.

Application June 11, 1949, Serial No. 98,499

6 Claims. (Cl. 175—183)

My invention is an improvement in electrical measuring apparatus, and especially apparatus for ascertaining and determining the inductance of coils for electric circuits.

The chief object of this invention is the same as set forth in my copending application, Serial No. 644,284, filed January 30, 1946, now Patent No. 2,577,592, covering a device for measuring inductance and self-capacitance, which describes a method by which a coil of unknown inductance is tuned with a condenser of known characteristics to some harmonic of a fundamental frequency produced by an oscillator which can also emit harmonics thereof. A vacuum-tube voltmeter connected to the coil indicates when resonance is obtained. The order or value of each harmonic is revealed by increasing the oscillator frequency from the fundamental till the voltmeter again shows a resonant condition. The various harmonics are simple multiples of the fundamental frequency and the harmonic order is determined by manipulating the oscillator frequency. The number of the harmonic when multiplied by the fundamental frequency gives the harmonic frequency to which the unknown inductance is tuned by a calibrated variable condenser in the measuring circuit. This condenser is equipped with a dial having a separate scale for each particular harmonic, the scales all being calibrated in inductance units. Also, the self-capacitance of a coil is determined with the aid of a small calibrated condenser connected across the main condenser, by decreasing the small condenser to such a value that the inductance measured would be the same as read on any two scales; this value being the pure inductance of the coil, and the decrease of value of the small condenser is equal to the self-capacitance of the coil.

The embodiment of this invention also comprises an oscillator giving harmonics. The output is conducted as before unto a calibrated tuned circuit. But the harmonic order is ascertained in a much simpler manner. The fundamental frequency is held constant at all times and the calibrated measuring circuit branches into several tuned circuits, each resonant to a different harmonic of the fundamental frequency. As many such circuits are employed as there are harmonics to be used, a separate one for each harmonic; and all these circuits follow the calibrated condenser whereon each harmonic has a separate scale. Each of these tuned circuits gives positive indication when energized by actuating a relay which causes a lamp to illuminate the scale associated with the particular circuit, or by conveying this information in any other practical way.

Following each of these tuned circuits is a resonance indicator for the measuring circuit. Such an indicator can be inserted in each circuit; or only one indicator can be utilized in a line common to all of the tuned circuits.

Detuning of any of the tuned circuits does not correspondingly shift the position of the resonance peak on the indicator, thereby giving a false inductance reading. What it does is lower the amplitude of the deflection only. This fact is utilized for equalizing the amplitudes of the various harmonics for more nearly uniform action on the relays and tuning indicators in the respective circuits.

The nature of the invention is fully described herein and the novel features are set forth in the claims. But this disclosure is by way of example only, and I may vary the details of the apparatus employed without departing from the essential principle of the invention.

On the drawings:

Figure 1 shows the outline of the circuits utilized with the invention;

Figure 2 shows the oscillator circuit producing harmonics linked to the fixed-tuned circuits by the measuring circuit; and the resonance indicator following the relays.

Figure 3 shows the scale for the condenser in the measuring circuit.

The numeral 1 indicates a thermionic oscillator tube, with its anode connected to a source of electric energy 2. The negative pole of this source is connected to the junction of a coil 3 in parallel with a fixed tuning condenser 4. The opposite terminals of the coil 3 and condenser 4 are coupled to the control electrode of the tube 1 by means of a condenser 5. The output circuit tube contains an adjustable primary coil 6 loosely coupled to coil 7. This output circuit also contains a by-pass condenser 8, and a similar condenser 8 bridges the poles of the source 2. The oscillator circuit also has the usual grid leak 9, and the negative terminal of the source 2 has a ground connection 10. This circuit is well known and of course is not part of my invention. The grid and grid leak are connected by a lead 11 to an intermediate point of the coil 3.

The coil 7 has unkown inductance and self capacitance. It is connected in parallel with an adjustable condenser 12 having scales 28 for each harmonic frequency, as illustrated in Figure 3. This condenser is in parallel with another condenser 13. One side of the secondary circuit is grounded and the other side is connected to the input electrode of a cathode output amplifier tube 14. The secondary coil 7 in the measuring circuit. The cathode follower 14 is united to a number of tuned circuits in multiple, connected to a rectifier and relay tube 21 followed by a common resonance meter 23, or with a separate resonance meter in each of these circuits, if preferred.

The cathode of the amplifier 14 is connected to a number of parallel selector circuits, one of which appears in full on Figure 1. It comprises an amplifier 15 of the pentode type, united through a conductor 16 and a by-pass condenser 8, to the cathode of the tube 14. A wire 17 joined to a source of electric energy puts a 3-volt negative bias on the grid of the tube 16; which is powered by a source of electric energy at +100 volts D. C. connected thereto by a lead 18. The anode of the tube 15 is united through a suitable condenser 19 and resistance 20 of 1 megohm to one positive terminal of a double rectifier and relay tube 21. One of the cathodes of the tube 21 is also joined to the resistance 20 at the end connected to the condenser 19, and the double grid or control electrode of the tube 21 is united by a conductor 22 to a source of electric energy to bias it as minus 20 volts. The other anode of the tube 21 is united to a relay winding 24, connected to a source of current of about 250 volts by a line 25. The relay winding 24 controls a switch 26 having a fixed and a movable terminal, and is normally in open circuit position till the coil 24 is energized. From the movable terminal of the relay switch 26 a conductor leads to an incandescent lamp 27. The lead 16 is connected at a point between the tube 14 and the condenser 8 through a resistance 29 of about 1000 ohms to ground. The grids of the tubes 15 of all the other selector circuits are also connected to the condenser 8 and are also biased at 3 volts.

The several selector circuits, all of this character, are arranged as illustrated in Figure 2; all being in parallel; and joined to the measuring circuit containing coil 7 and condensers 12 and 13 through a common cathode output amplifier 14. The tubes 15 are connected to the tube 14 through the common condenser 8 connected to the cathode of the tube 14. The selector circuits may have separate meters 23, or be united to a single meter 23 as indicated by the broken lines 30 in Figure 1. The lamps 27 of these selector circuits are each disposed in juxtaposition to one of the circular scales 28 of the condenser 12. This instrument has a knob 31, which turns a pointer 32 over the separate scales 28. For example there are six separate scales, each for use with one of the selector circuits, which are of course of the same number. Each selector circuit will be tuned to resonate at one of the harmonic frequencies, which range from 1 up to six times the fundamental frequency.

Suppose the coil 7 to have unkown inductance and self capacitance; it is connected as shown in Figure 1; or between terminals A and B in Figure 2, and loosely coupled to the oscillator output coil 6. With condenser 13 set at its maximum value, the attendant revolves the shaft of condenser 12 through a resonance peak as shown on the meter 23, and holds the pointer setting at the maximum reading on this meter. Resonating this measuring circuit impresses a voltage across the input terminals of the cathode output amplifier 14, which results in a corresponding voltage, developed across the 1,000 ohms bias resistor 29. This voltage has the same frequency as that exciting the measuring circuit, and is at a relatively low impedance. It is now impressed upon all the selector circuits over all the lead circuits at over all the leads 16 and 30 in Figure 1.

In each selector circuit, this exciting voltage is impressed between grid and ground, to which the cathode of the tube 15 is connected, and appears in the plate circuit, which contains a parallel resonant coil and condenser combination 36 permanently tuned to the same harmonic of the circuit. This voltage sends a current through the 1 megohm resistor 20 which is shown connected between cathode and grid-plate of the rectifier tube. This current sets up a voltage across this resistor 20 which is in opposition to the 20 volt bias and causes the rectifier to start drawing current. The grid of the other section of this tube becomes more positive, allowing plate current to flow to give the maximum reading in meter 23 and cause the relay coil 24 in the plate circuit to close the switch 26 at some point before the resonance point is shown on the meter 23. The closing of this relay causes the pilot light 27 for scale 1 (corresponding to the first harmonic, for example) to light up and indicate this scale as the proper one to read for the inductance value. When this reading is obtained with pointer 32 on the shaft of condenser 12, one has the apparent inductance of the coil 7. When the condenser 13 is reduced from its initial value by the amount of the self-capacitance of the coil, any two inductance readings taken as described above on the proper scale 28 for the corresponding harmonic, will have the same value, and this will be the pure inductance of the coil 7. The condenser 13 is set at different values, by trial, until a value is found such as to make the inductance readings as taken on any two scales to be the same. The meter 23 draws no current unless a condition of resonance exists in one selector circuit. As indicated in Figure 1 this meter is connected at one point K to the same cathode of the rectifiers 21 in all the selector circuits, so that one meter 23 will indicate resonance existing in any of the selector circuits. This meter 23 does not tell which selector circuit is resonant, but the illuminated pilot light 27 performs this function.

However, the relays and pilot lights may be omitted. Then a meter 23 is connected in each selector circuit. There would then be as many meters as circuits, each corresponding to a scale 28 on the inductance dial. Or, a single meter may be used without lamps, and be switched successively into each circuit to determine which is resonant. It is also possible to employ a gas tube to glow on resonance, and dispense with the relay and pilot light arrangement.

The scheme shown in Figures 1 and 2 is for diagrammatic purposes only, and is not intended to limit my invention to that particular arrangement. The main purpose is to indicate in a practical manner which inductance scale 28 to read, or which harmonic is being resonated in the measuring circuit.

By this method the fundamental frequency is kept fixed, so the intensity of the harmonic frequencies for the particular combination is fixed also, and the design problem is simplified. Much cost and care are thus avoided. By holding the fundamental frequency fixed, it is now possible to have crystal control of frequency, so that the fundamental and all of its harmonics are rendered independent of temperature, humidity and other frequency shifting factors.

Amplitude control of the various harmonics is easily attained by detuning, as required, the fixed-tuned circuits. This is very effective where crystal control of frequency is used. The insertion of the resonance indicating meter 23 at the end of tuned selector circuits makes it possible to dispense with low-pass filters which would otherwise be needed, between the oscillator and the measuring circuit.

The measurement of inductance and of self-capacitance is rendered much more rapid and accurate risks of error are decreased.

The harmonics 2*f*, 3*f*, 4*f*, etc. may all come from the distorted wave shape of the fundamental frequency of oscillation, or from independent oscillators having fundamental frequencies of 2*f*, 3*f*, 4*f*, etc.; provided only that the harmonics of these higher fundamental frequencies be of low enough value or amplitude as to be incapable of deflecting the resonance indicating meter 23. Thus, if one of the harmonics of *f* is too weak to be effective, it may be boosted by an independent oscillator having the same fundamental frequency as the weak harmonic and properly coupled to it.

Having described my invention, what I believe to be new is:

1. Apparatus for measuring inductance and capacitance comprising, a circuit containing a single thermionic oscillator of predetermined frequency for generating a number of harmonics of said frequency, a measuring circuit in operative relation to said circuit and energized thereby, and comprising a condenser and an inductance tuned to one harmonic frequency of the oscillator; parallel selector circuits, each tuned to a different harmonic of the oscillator, and having connections to the measuring circuit, so that one such selector circuit is energized when the coil is tuned by the condenser and thus indicates the frequency to which said coil is tuned, said connections including an amplifier adjacent the measuring circuit, and having a cathode, a resistance element connected to said cathode and ground, and a second amplifier connected to the first between said cathode and said resistance, and an instrument for indicating resonance in the energized selector circuit, said apparatus also having a thermionic relay united to said selector circuits, and a switch controlled by relay for said instrument.

2. Apparatus for measuring inductance and capacitance comprising a single source of oscillations comprising different frequencies, a tuned measuring circuit energized from said source, the measuring circuit containing means to produce resonance in the measuring circuit, additional parallel circuits, each of which is designed to be energized at one of said frequencies, and means for indicating the circuit which is operative when resonance is produced in the measuring circuit, said apparatus also having a thermionic relay united to said parallel circuits, and a switch controlled by said relay for said indicating means.

3. Apparatus for measuring inductance and capacitance comprising a single thermionic source of oscillations producing a fundamental frequency and harmonic frequencies thereof, a group of parallel tuned circuits each of which contains amplifying and rectifying means and is tuned to operate at resonance on a different one of said harmonic frequencies, and a measuring circuit energized from said source having a variable condenser and an inductance to be tuned with said condenser at one of said frequencies, said measuring circuit being connected to all of the tuned circuits, and an instrument for indicating resonance in the measuring circuit and the one additional circuit which is active, said apparatus having a switch for said instrument controlled by said amplifying means.

4. Apparatus for measuring inductance and capacitance comprising, a circuit, a single thermionic oscillator therein to produce a fundamental frequency and harmonics thereof, parallel tuned circuits, each one to operate one of the harmonic frequencies, said circuits having a lamp and a relay therefor, so that when one tuned circuit is energized it illuminates the lamp and indicates that said circuit is active, thus identifying its frequency, a measuring circuit between the oscillator and the tuned circuits, and energized by the oscillator, said measuring circuit containing an inductance to be measured and a calibrated variable condenser with a dial having an inductance scale corresponding to each frequency, and an instrument associated with the tuned circuits to indicate resonance in the measuring circuit and showing on the dial of the condenser the inductance of the coil, said relay and lamp being connected to said instrument.

5. Apparatus for measuring inductance and capacitance comprising, a circuit, a single thermionic oscillator therein to generate a fundamental frequency and harmonics thereof, parallel circuits each tuned to operate on a different harmonic frequency of the oscillator, a measuring circuit having connections with the oscillator and tuned circuits, said connections including an amplifier adjacent the measuring circuit and having a cathode, a resistance joined to the cathode and ground, and a second amplifier connected to the first between said cathode and said resistance, a coil and a calibrated condenser in the measuring circuit, said condenser having scales, one for each of the tuned circuits, a relay and pilot light in each tuned circuit, said pilot light connected to be energized whenever the circuit containing it is in resonance and illuminating the corresponding scale of the condenser in the measuring circuit, and an instrument to indicate resonance in the tuned circuits.

6. Apparatus for measuring inductance and capacitance comprising a single thermionic oscillator and a circuit therefor to produce a fundamental frequency and harmonics thereof, parallel tuned circuits each to operate on a different harmonic, a relay and pilot light connected to be energized when any of the tuned circuits operate, a measuring circuit having connections with the oscillator circuit and the tuned circuits and containing an inductance and variable condenser, said connections including an amplifier adjacent the measuring circuit and having a cathode, a resistance joined to the cathode and ground, and a second amplifier connected to the first between said cathode and said resistance, one condenser having scales calibrated one for each frequency and the other being calibrated in capacitance-units removed from its initial position of maximum capacitance, and an instrument indicating resonance in the measuring and tuned circuits.

EDWARD M. SHIEPE.

REFERENCES CITED

The following references are of record in the file of this patent:

UNITED STATES PATENTS

| Number | Name | Date |
| --- | --- | --- |
| 1,816,958 | Clark et al. | Aug. 4, 1931 |
| 1,867,131 | Bennett | July 12, 1932 |
| 2,005,011 | Specht | June 18, 1935 |
| 2,047,617 | Conron | July 14, 1936 |
| 2,159,790 | Freystedt et al. | May 23, 1939 |